United States Patent [19]
Katsuragawa

[11] Patent Number: 5,661,359
[45] Date of Patent: Aug. 26, 1997

[54] VIBRATION TYPE MOTOR DEVICE

[75] Inventor: Mitsuhiro Katsuragawa, Utsunomiya, Japan

[73] Assignee: Canon Kabushiki Kaisha, Tokyo, Japan

[21] Appl. No.: 595,479

[22] Filed: Feb. 1, 1996

[30] Foreign Application Priority Data

Feb. 3, 1995 [JP] Japan ................. 7-016820

[51] Int. Cl.⁶ ................................. H01L 41/08
[52] U.S. Cl. ........................... 310/316; 318/116
[58] Field of Search ................. 310/323, 328, 310/316, 317, 319; 318/116

[56] References Cited

U.S. PATENT DOCUMENTS

| | | | |
|---|---|---|---|
| 4,713,571 | 12/1987 | Suzuki et al. | 310/316 |
| 4,749,896 | 6/1988 | Suzuki et al. | 310/316 |
| 4,794,294 | 12/1988 | Shimizu et al. | 310/316 |
| 4,833,358 | 5/1989 | Suzuki et al. | 310/316 |
| 4,914,336 | 4/1990 | Yamasaki | 310/316 |
| 5,136,215 | 8/1992 | Izukawa | 318/116 |
| 5,146,143 | 9/1992 | Furutsu | 318/116 |
| 5,153,486 | 10/1992 | Hirotomi | 318/116 |
| 5,155,418 | 10/1992 | Kataoka | 318/116 |
| 5,162,708 | 11/1992 | Naito et al. | 318/116 |
| 5,214,339 | 5/1993 | Naito | 310/316 |

*Primary Examiner*—Mark O. Budd
*Attorney, Agent, or Firm*—Fitzpatrick, Cella, Harper & Scinto

[57] ABSTRACT

A vibration type motor device in which a travelling wave is formed by applying a cyclic signal to a piezoelectric member so as to vibrate a vibration member, thereby driving a moving member. When a cyclic signal actually applied to the piezoelectric member has a frequency near the resonance frequency, it is determined whether the moving member can be properly driven.

11 Claims, 11 Drawing Sheets

FIG. 2A OUTPUT OF VCO4
FIG. 2B OUTPUT OF P2
FIG. 2C OUTPUT OF P3
FIG. 2D INPUT OF AMPLIFICATION CKT. 10
FIG. 2E INPUT OF AMPLIFICATION CKT. 11 imate # VIBRATION TYPE MOTOR DEVICE

BACKGROUND OF THE INVENTION

1. Field of the Invention

The present invention relates to a vibration wave (vibration type) motor driving device for driving a vibration wave (vibration type) motor.

2. Related Background Art

As a determination method used when a motor cannot be driven due to an overload or the like during controlling a target object, a method of determining that driving is impossible when the driving portion of the motor is not driven for a predetermined time or more is used frequently. For example, in voltage-controlled DC motors and the like, this determination is performed with application of a maximum voltage. However, in frequency-controlled vibration wave motors which have been put into practical applications, proper driving impossibility determination cannot be attained. The reason is as follows. A frequency-controlled vibration wave motor generates a maximum torque during rotation at frequencies near the resonance frequency as its characteristics, but the resonance frequency changes depending on environmental conditions such as temperatures. If a driving impossibility determination frequency is greatly shifted from the resonance frequency, the motor may not be driven regardless of a load.

To solve this problem, a method has been proposed in which a driving impossibility determination time is prolonged, and a range of driving frequency is swept during this driving impossibility determination time.

In the above-mentioned method, however, the driving impossibility determination time is set constant regardless of the magnitudes of frequencies with respect to the resonance frequency. With this setting, a motor is kept energized at frequencies near the resonance frequency for an excessively long time until it is determined that driving is impossible, resulting in an increase in power consumption.

SUMMARY OF THE INVENTION

One aspect of the application is to provide a device for determining that driving is impossible at a proper frequency by using the vibration state signal of a vibration wave motor.

One aspect of the application is to provide a device for properly setting a driving impossibility determination reference (time) by using the vibration state signal of a vibration wave motor, thereby preventing wasteful power consumption.

One aspect of the application is to provide a device for properly setting a driving impossibility determination reference (time) by using the vibration state signal and driving amount of a vibration wave motor, thereby preventing wasteful power consumption.

According to one aspect of the application, there is provided a vibration wave motor driving device comprising vibration state detection means for detecting a vibration state of a vibration wave motor to output whether the vibration wave motor is driven at a resonance frequency or at a frequency near the resonance frequency, driving state detection means for detecting driving of a member driven by the vibration wave motor, and driving impossibility determination means for determining that driving of the vibration wave motor is impossible on the basis of a result of the detection means, wherein the driving impossibility determination means determines an operative or inoperative state in accordance with an output of the vibration state detection means.

According to another aspect of the application, there is provided a vibration wave motor driving device comprising vibration state detection means for detecting a vibration state of a vibration wave motor to output whether the vibration wave motor is driven at a resonance frequency or at a frequency near the resonance frequency, driving detection means for detecting driving of a member driven by the vibration wave motor, and driving impossibility determination means for determining that driving of the vibration wave motor is impossible, wherein the driving impossibility determination means switches a driving impossibility determination reference in accordance with an output of the vibration state detection means.

According to another aspect of the application, there is provided a vibration wave motor device comprising driving state detection means for detecting a driving state of the vibration wave motor to output whether the vibration wave motor is driven at a resonance frequency or at a frequency near the resonance frequency, driving amount detection means for detecting a driving amount of a member driven by the vibration wave motor, and driving impossibility determination means for determining that driving of the vibration wave motor is impossible, wherein the driving impossibility determination means switches a driving impossibility determination reference in accordance with an output of the driving state detection means and an output of the driving amount detection means.

Other objects of the present invention will become apparent from the following description of the embodiments taken in conjunction with the accompanying drawings.

BRIEF DESCRIPTION OF THE DRAWINGS

FIGS. 2A to 2E are charts showing waveforms for explaining the operation of the embodiment shown in FIG. 1;

DESCRIPTION OF THE PREFERRED EMBODIMENTS

Figure 1:
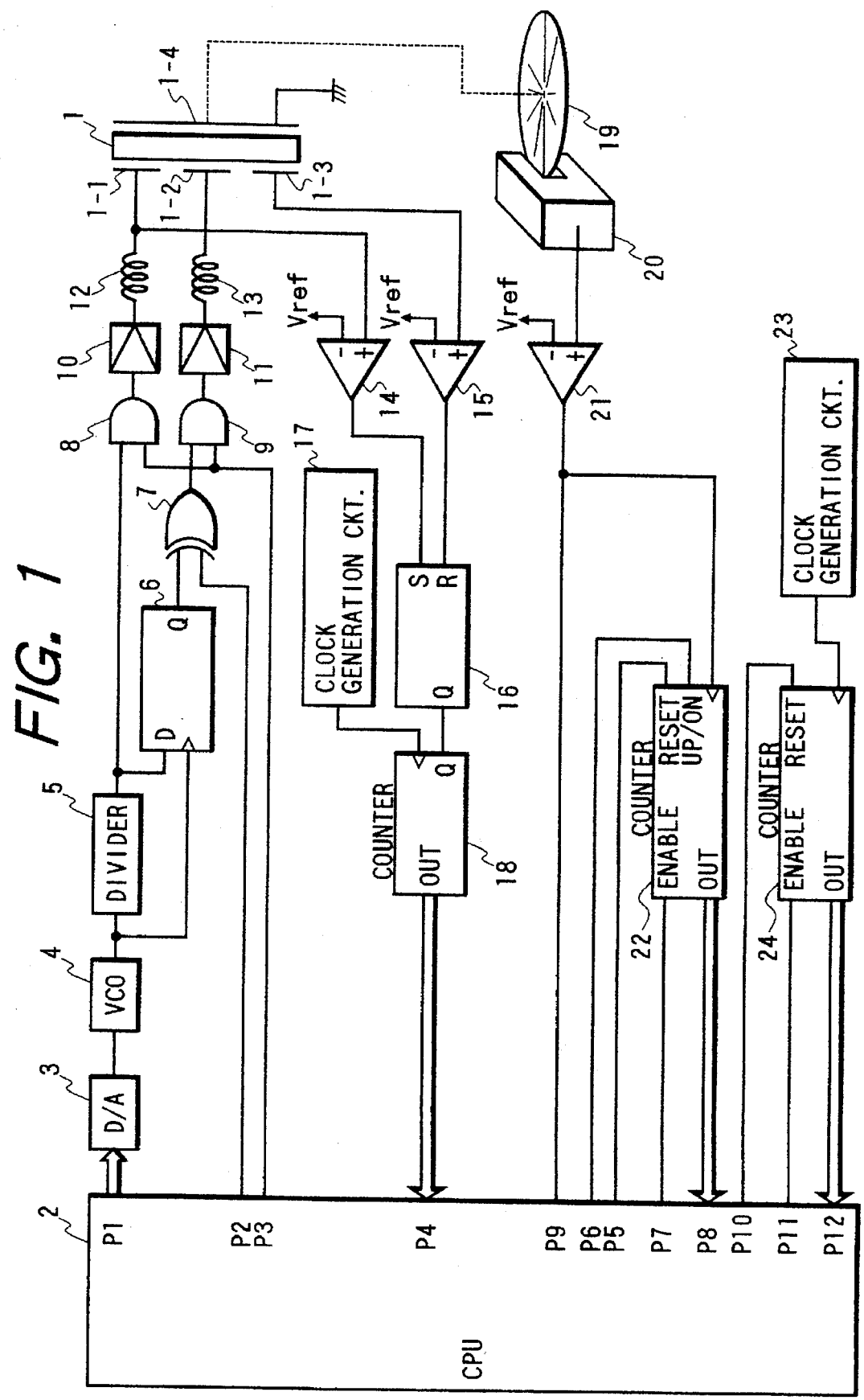
FIG. 1 is a circuit diagram showing a vibration type motor device according to the first embodiment of the present invention.

FIG. 1 is a diagram showing a driving circuit for a vibration wave (vibration type) motor according to the first embodiment.

Referring to FIG. 1, electro-mechanical energy conversion elements, such as two groups of polarized electrostrictive or piezoelectric elements, for generating vibrations upon reception of cyclic signals are arranged on the surface of a stator 1 for the vibration wave (vibration type) motor. Driving electrodes 1-1 and 1-2 apply periodic voltages having a phase difference of 90° therebetween to each group of electrostrictive elements (piezoelectric elements). A monitor electrode 1-3 detects the vibration state of the stator and is arranged on an electrostrictive element (piezoelectric element) which is electrically insulated from the driving electrodes 1-1 and 1-2. A common electrode 1-4 is commonly used for the electrodes 1-1, 1-2, and 1-3.

A microcomputer (to be referred to as a CPU hereinafter) 2 serves as a processing circuit. The CPU 2 comprises output ports P1, P2, P3, P5, P6, P7, P10, and P11, input ports P4, P8, and P12, and an input port P9. At the input port P9, an interruption is generated at the leading edge of an input signal. The driving circuit for the vibration wave motor also includes a D/A converter 3 and a voltage-controlled oscillator (to be referred to as a VCO hereinafter) 4. More specifically, the D/A converter 3 converts a digital signal output from the output port P1 of the CPU 2 into an analog signal, and the VCO 4 outputs a cyclic signal corresponding to the analog signal. In this embodiment, the D/A converter 3 receives an 8-bit input signal. The output frequency of the VCO 4 becomes lower as the input voltage is higher. Therefore, the VCO 4 has the highest output frequency when the output port P1 is set at 00H, and has the lowest output frequency when the output port P1 is set at FFH.

A frequency divider 5 divides the output frequency of the VCO 4 by 4. The data input terminal of a shift register 6 receives the output of the divider 5, while the clock input terminal of the shift register 6 receives the output of the VCO 4. A cyclic signal having a phase delay of 90° with respect to the input signal of the data input terminal is output from an output terminal Q of the shift register 6.

One input terminal of an exclusive-OR circuit (to be referred to as an EXOR hereinafter) 7 is connected to the output terminal Q of the shift register 6, while the other input terminal of the EXOR 7 is connected to the output port 2 of the CPU 2.

One input terminal of an AND gate (to be referred to as an AND hereinafter) 8 is connected to the output terminal of the divider 5, and one input terminal of an AND 9 is connected to the output terminal of the EXOR 7. The other input terminal of each of the ANDs 8 and 9 is connected to the output port P3 of the CPU 2.

Amplification circuits 10 and 11 amplify the output signals of the ANDs 8 and 9, respectively. The output signal of the amplification circuit 10 is supplied to the driving electrode 1-1 via a coil 12, while the output signal of the amplification circuit 11 is supplied to the driving electrode 1-2 via a coil 13.

FIGS. 2A to 2E are timing charts showing the relationship between the output signals of the output ports P2 and P3 of the CPU 2, and the input signals of the amplification circuits 10 and 11. As shown in FIGS. 2A to 2E, permission/inhibition of cyclic signals to the amplification circuits 10 and 11, i.e., permission/inhibition of energization to the vibration wave motor is controlled in accordance with the output signal of the output port P3 of the CPU 2. The phase relationship between the input signals of the amplification circuits 10 and 11 is switched by +90° or −90° in accordance with the output signal of the output port P2 of the CPU 2 to control the direction of rotation of the vibration wave motor.

In this embodiment, the vibration wave motor rotates clockwise when the output signal of the output port P2 of the CPU 2 is at low level, and rotates counterclockwise when the output signal of the output port P2 is at high level. Note that a cyclic signal to be supplied has a frequency obtained by dividing the frequency of the output signal of the VCO 4 by 4.

The positive and negative input terminals of a comparator 14 are connected to the driving electrode 1-1 and a reference voltage (to be referred to as a Vref hereinafter), respectively. The positive and negative input terminals of a comparator 15 are connected to the monitor electrode 1-3 and the Vref, respectively. The comparators 14 and 15 convert the signals of the driving electrode 1-1 and the monitor electrode 1-3 into cyclic signals at digital level. The S and R input terminals of a phase comparison circuit 16 are connected to the output terminals of the comparators 14 and 15, respectively. The output terminal of the phase comparison circuit 16 goes to high level upon reception of a rise signal at the S input terminal, and goes to low level upon reception of a rise signal at the R input terminal. More specifically, since the output terminal of the phase comparison circuit 16 is set at high level during a period between the leading edges of the outputs of the comparators 14 and 15, this period indicates the phase delay time of the monitor electrode 1-3 with respect to the driving electrode 1-1. A clock generation circuit 17 outputs a reference clock. The clock input terminal of an up counter 18 is connected to the clock generation circuit 17, while the count control input terminal of the counter 18 is connected to the output terminal of the phase comparison circuit 16. In this embodiment, when a rise signal is input to the count control input terminal of the counter 18, the count value is cleared, and the up counter is caused to operate. When a fall signal is input to the count control terminal, the count operation is stopped, and the count value is latched on the output side. The output terminal of the counter 18 is connected to the input port P4 of the CPU 2, so that the CPU 2 can read, from the input port P4, the latest phase delay time as the clock number of the clock generation circuit 17.

A pulse plate 19 rotates together with a member which rotates or moves upon vibration of the stator 1. Light-transmitting patterns are arranged at a predetermined interval on the pulse plate 19. A photo-reflector 20 includes a light-emitting source and a phototransistor. Every time the light-transmitting pattern passes through the photo-reflector 20 upon rotation of the pulse plate 19, the photo-reflector 20 outputs a signal corresponding to the rotation amount of the pulse plate 19. A comparator 21 converts the output signal of the photo-reflector 20 into a digital-level signal. Note that the above-mentioned pulse plate may be directly rotated by the driving force of the motor device.

An up/down counter 22 receives the output of the comparator 21 as a clock. The reset terminal, up/down control terminal, and count permission/inhibition control terminal of the counter 22 are connected to the output ports P5, P6, and P7 of the CPU 2, respectively. In addition, the output terminal of the counter 22 is connected to the input port P8 of the CPU 2. The counter 22 converts the rotation amount of the pulse plate 19 into the number of output pulses.

The output signal of the comparator 21 is supplied to the clock terminal of the counter 22 and also to the interruption input terminal P9 of the CPU 2.

A clock generation circuit 23 outputs a reference clock. The clock input terminal, reset terminal, and count permission/inhibition control terminal of an up counter 24 are connected to the clock generation circuit 23, and the output ports P10 and P11 of the CPU 2, respectively. In addition, the output terminal of the counter 24 is connected to the input port P12 of the CPU 2.

The counter 24 receives a count value from the port P12 every time an interruption is generated at the input port P9 during driving of the vibration wave (vibration type) motor, and is reset via the port P10 to obtain a time interval between the edge of a pulse signal output from the comparator 21 and the edge of a next pulse signal on the basis of the number of clock pulses of the clock generation circuit 23.

Figure 3:
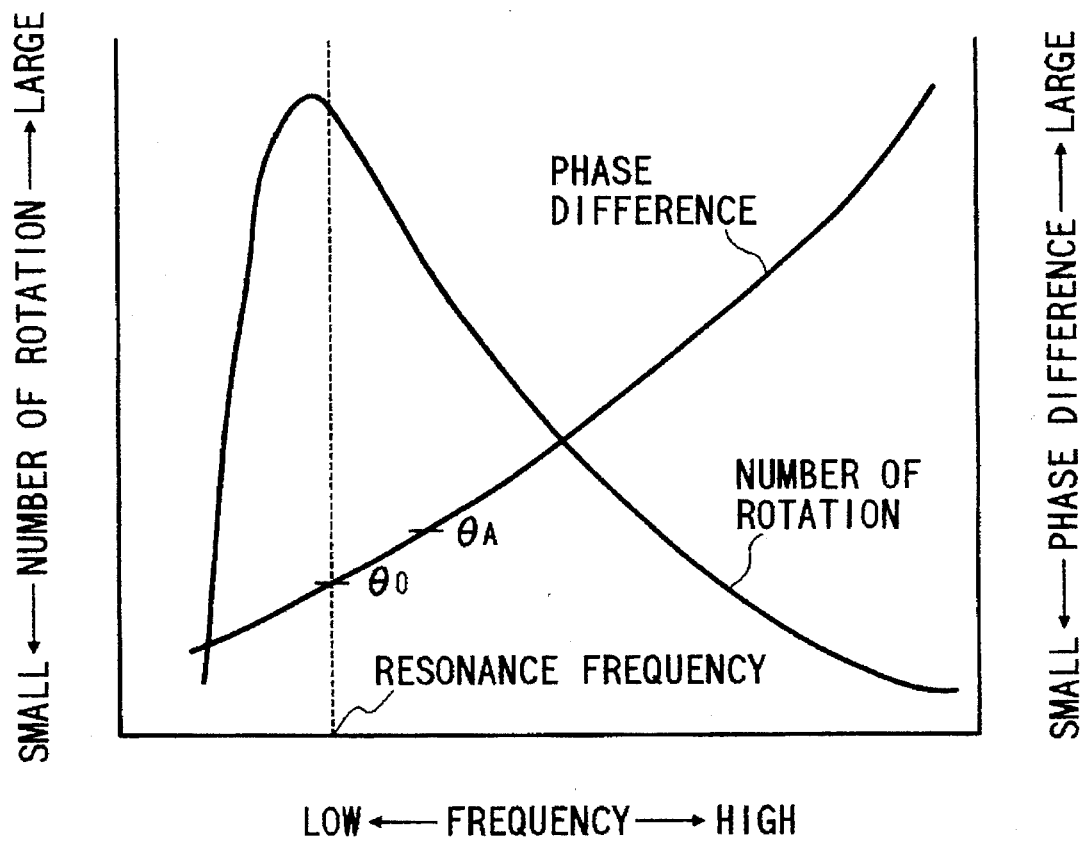
FIG. 3 is a graph showing the characteristics of the vibration type motor.

FIG. 3 is a graph showing the relationship between the frequency and the number of rotation or rotation speed of the vibration wave (vibration type) motor used in this embodiment, and the phase delay amount (to be referred to as a phase difference hereinafter) of the monitor electrode 1-3 with respect to the driving electrode 1-1. The frequency is plotted along the abscissa, and the number of rotations and the phase difference are plotted along the ordinate. Referring to FIG. 3, when the frequency is swept from the high-frequency side to the low-frequency side, the motor begins to rotate at a certain speed. When the frequency is further swept to the low-frequency side, the number of rotations gradually increases. When the frequency becomes lower than the resonance frequency of the vibration wave (vibration type) motor, the number of rotations abruptly decreases. On the other hand, in FIG. 3, the phase difference becomes smaller as the frequency is swept to the low-frequency side. From these characteristics, if the phase difference is monitored in acceleration, e.g., in sweeping the frequency to the low-frequency side, and the frequency is swept within a range in which the phase difference becomes larger at the resonance frequency, the above-mentioned abrupt decrease in the number of rotations can be prevented. In this embodiment, the phase difference at the resonance frequency is defined as θ0, and the phase difference on a frequency side higher by a predetermined amount than the resonance frequency is defined as θA. When the phase difference is smaller than θ0 during driving of the motor, the frequency is increased regardless of the driving speed. When the phase difference is between θ0 and θA, a decrease in frequency for acceleration is inhibited, thereby preventing an abrupt decrease in the number of rotations.

In some cases, a large load or the like is applied to a member driven by the vibration wave motor, and the motor fails even if the frequency is swept. In this case, the pulse plate 19 is not rotated, so the photo-reflector 20 does not output a signal. Accordingly, when the pulse output of the comparator 21 does not change for a predetermined time, the CPU 2 determines that driving is impossible, and stops energization to the vibration wave motor, avoiding wasteful power consumption.

In voltage-controlled DC motors and the like, the driving impossibility determination time (to be referred to as T0 hereinafter) at this time may be set in a full-power supply state. In frequency-controlled vibration wave motors, however, a frequency at which the number of rotations abruptly decreases as described above cannot be specified because the resonance frequency changes depending on environmental conditions. For this reason, the driving impossibility determination time must be changed depending on whether the current frequency during application of the vibration wave motor is sufficient to drive the motor. More specifically, when the frequency is sufficient to drive the motor, the driving impossibility determination time T0 can be determined. If not, the frequency is swept to a frequency sufficient to drive the motor, and then the driving impossibility determination time T0 is determined. In this embodiment, whether the frequency is sufficient to drive the motor is determined on the basis of whether the phase delay amount (phase difference) of the monitor electrode 1-3 with respect to the driving electrode 1-1 is smaller than θA in FIG. 3.

Memories in the CPU 2 will be described. A memory DRV_DATA represents a target driving amount. The vibration wave motor is stopped at a position where the contents of the target driving amount DRV_DATA coincide with the count value of the counter 22. A memory DRV_REME represents a driving remaining amount, and the driving remaining amount DRV_REME is represented by the difference between the target driving amount DRV_DATA and the count value of the counter 22. A memory DRV_SPED represents a target driving speed, and the target driving speed DRV_SPED is represented by the pulse interval between the output pulses of the comparator 21, i.e., the count value of the counter 24. In the system of this embodiment, DRV_SPED is set for each driving remaining amount. A memory DRV_SPDO stores the contents of the target driving speed DRV_SPED corresponding to the current driving remaining amount DRV_REME. A memory DRV_TOUT stores the count value of the counter 24 for determining that driving is impossible. When the count value of the counter 24 is larger than DRV_TOUT, it is determined that driving is impossible to stop energization to the vibration wave motor.

Figure 4:
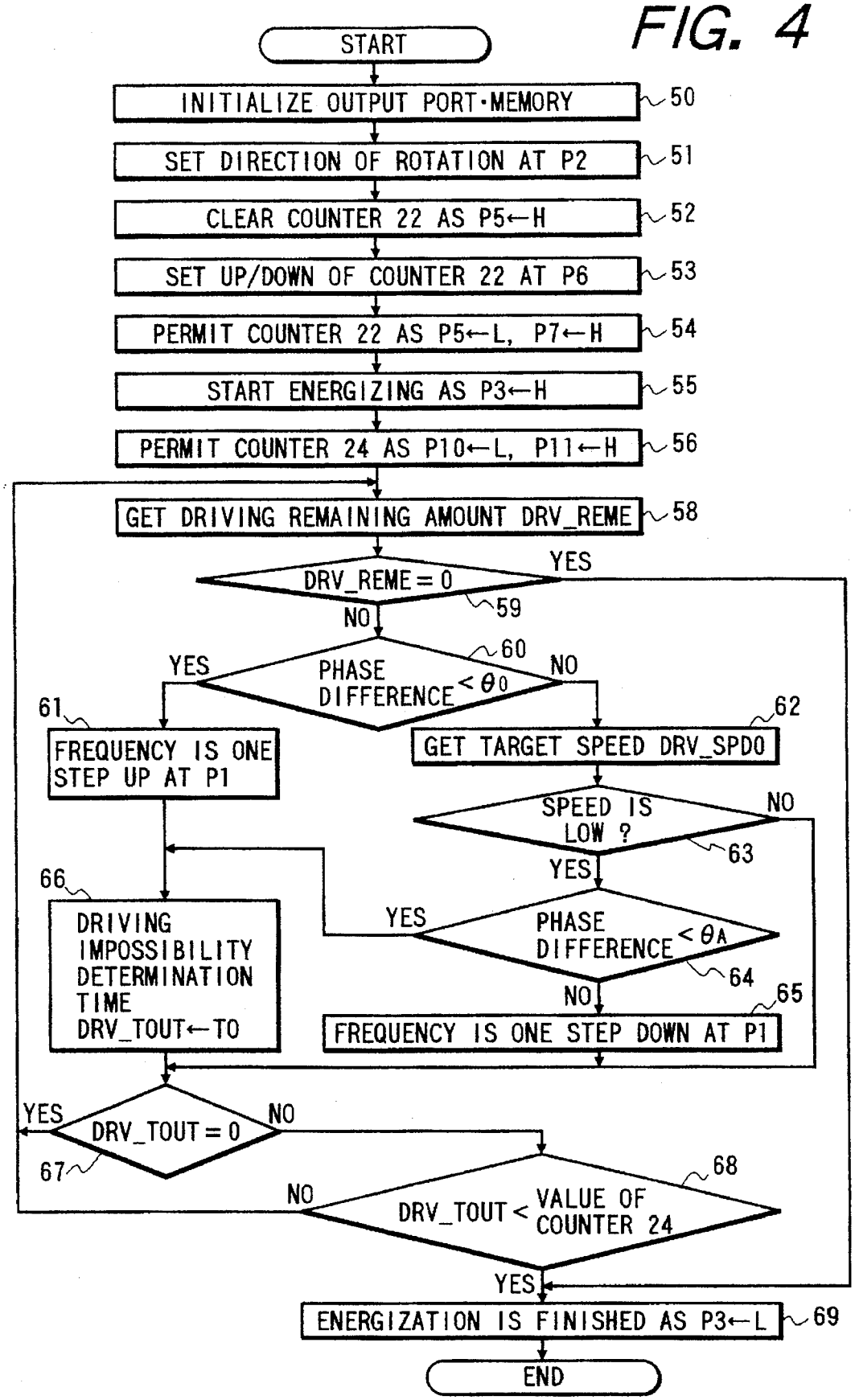
FIG. 4 is a flow chart for explaining the operation of the embodiment shown in FIG. 1.
Figure 5:
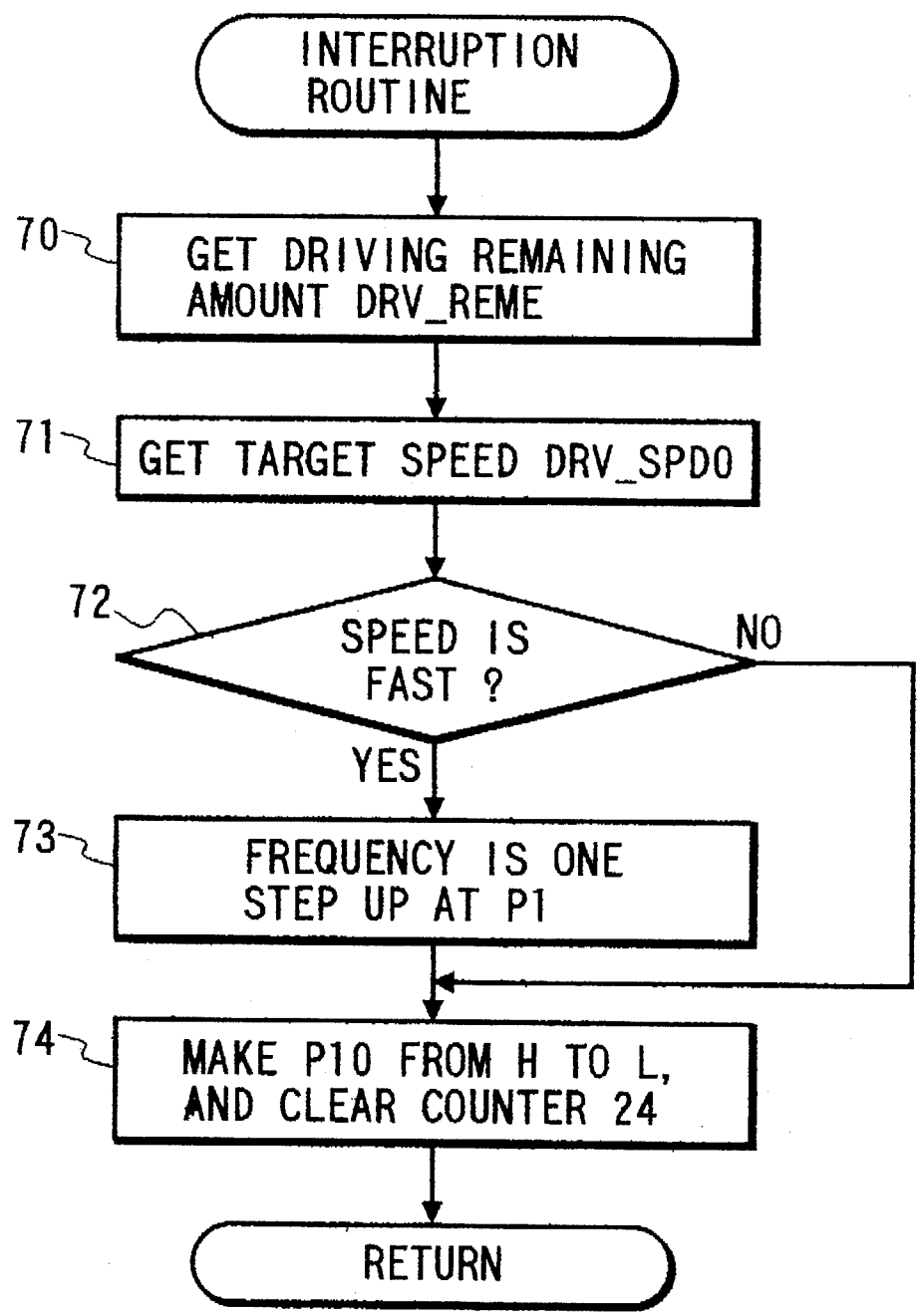
FIG. 5 is a flow chart for explaining the operation of the embodiment shown in FIG. 1 in conjunction with FIG. 4.

FIGS. 4 and 5 are flow charts respectively showing main and interruption routines for explaining the operation of the CPU 2. Steps in FIG. 4 will be described first.

Step 50: First of all, each output port is initialized to low level, and the memories DRV_SPDO and DRV_TOUT are initialized to 0.

Step 51: The direction of driving of the vibration wave motor is set. That is, the output port P2 is set to low level when the vibration wave motor is rotated clockwise, and to high level when the motor is rotated counterclockwise.

Step 52: The output port P5 is set to high level to clear the output of the counter 22 which represents the number of rotations of the pulse plate 19.

Step 53: It is set at the output port P6 whether the counter 22 counts up or down. In this embodiment, when the vibration wave motor is rotated clockwise, the output port P6 is set to high level to cause the counter 22 to count up. To the contrary, when the motor is rotated counterclockwise, the output port P6 is set to low level to cause the counter 22 to count down.

Step 54: The output port P5 is set to low level, and the output port P7 is set to high level to permit counter 22 to count.

Step 55: The output port P3 is set to high level to start energization to the vibration wave motor. 00H is output from the output port P1 to drive the motor at a high frequency.

Step 56: After the vibration wave motor is energized, the output port P10 is set to low level, and the output port P11 is set to high level to permit the counter 24 to count.

Step 58: The driving remaining amount is calculated on the basis of the target driving amount DRV_DATA and the count value of the counter 22 and stored in the memory DRV_REME. Note that DRV_DATA is set at an arbitrary amount.

Step 59: If the driving remaining amount DRV_REME is 0, the flow advances to step 69 to finish the driving.

Step 60: The count value of the counter 18, i.e., the phase difference is read from the input port P4 and compared with θ0. If the phase difference is smaller than θ0 from the comparison result, the frequency is shifted to the high-frequency side in step 61. If the phase difference is not smaller than θ0, the flow advances to step 62.

Step 61: Data output from the current port P1 is decremented by one to shift the driving frequency to the high-frequency side, and the flow advances to step 66.

Step 62: The target driving speed DRV_SPED corresponding to the driving remaining amount DRV_REME is read out and stored in the memory DRV_SPDO.

Step 63: The contents of the memory DRV_SPDO are compared with the count value of the counter 24 which represents the current pulse interval. If DRV_SPDO is smaller than the count value, the actual speed is lower than the target speed, so that the flow advances to step 64 to perform processing for acceleration. If DRV_SPDO is larger than the count value, the flow advances to step 67.

Step 64: Since it has been determined in step 63 that the actual speed is lower than the target speed, the speed must be increased. If, however, the phase difference is smaller than θA as shown in the graph of FIG. 3, the current frequency is near the resonance frequency, so that the frequency is not changed, and the flow advances to step 66. If the phase difference is not smaller than θA, the current frequency has a margin with respect to the resonance frequency, so that the flow advances to step 65 to execute the acceleration.

Step 65: Data output to the port P1 is increased by one, and the frequency is decreased to execute the acceleration. Then, the flow advances to step 67.

Step 66: Since the phase difference is smaller than θ0 or θA, a frequency sufficient to drive the vibration wave motor is attained. The driving impossibility determination time T0 is stored in the memory DRV_TOUT.

Step 67: In step 50, the memory DRV_TOUT is initialized to 0. However, once the phase difference becomes smaller than θ0 or θA, the driving impossibility determination time T0 is stored in the memory DRV_TOUT. If DRV_TOUT=0, a frequency sufficient to drive the vibration wave motor is not attained, so no driving impossibility determination is performed, and the flow returns to step 58.

Step 68: The contents of the memory DRV_TOUT are compared with the count value of the counter 24 which represents a pulse interval. If DRV_TOUT is smaller than the count value, it is determined that driving is impossible, and the flow advances to step 69. If DRV_TOUT is not smaller than the count value, the flow returns to step 58.

Step 69: Since the target driving amount has been attained, or it has been determined that driving is impossible, the output port P3 is set to low level to finish the energization to the vibration wave motor.

FIG. 5 is a flow chart for explaining the interruption routine which is executed when a leading edge is input to the input port P9 to generate an interruption.

Step 70: The driving remaining amount is calculated on the basis of the target driving amount DRV_DATA and the count value of the counter 22 and stored in the memory DRV_REME.

Step 71: The target driving speed DRV_SPED corresponding to the driving remaining amount DRV_REME is read out and stored in the memory DRV_SPDO.

Step 72: The contents of the memory DRV_SPDO are compared with the count value of the counter 24 which represents the current pulse interval. If DRV_SPDO is larger than the count value, the actual speed is higher than the target object, so that the flow advances to step 73 to perform deceleration. If DRV_SPDO is smaller than the count value, the flow advances to step 74.

Step 73: Data output to the port P1 is decremented by one, and the frequency is increased to execute the deceleration.

Step 74: The output port P10 is set to high level and then to low level to clear the counter 24 in order to measure the next pulse interval. The interruption routine is finished.

As has been described above, when the phase difference is larger by a predetermined amount than θA on the high-frequency side with respect to the resonance frequency, a frequency sufficient to drive the vibration wave motor is not attained. In this case, if the speed is low, the frequency is further decreased to supply more power to the motor. When the phase difference becomes smaller than θA, the frequency at the time is held because a further decrease in frequency may abruptly decrease the number of rotations. After the driving impossibility determination time T0, it is determined that driving is impossible.

Figure 6:
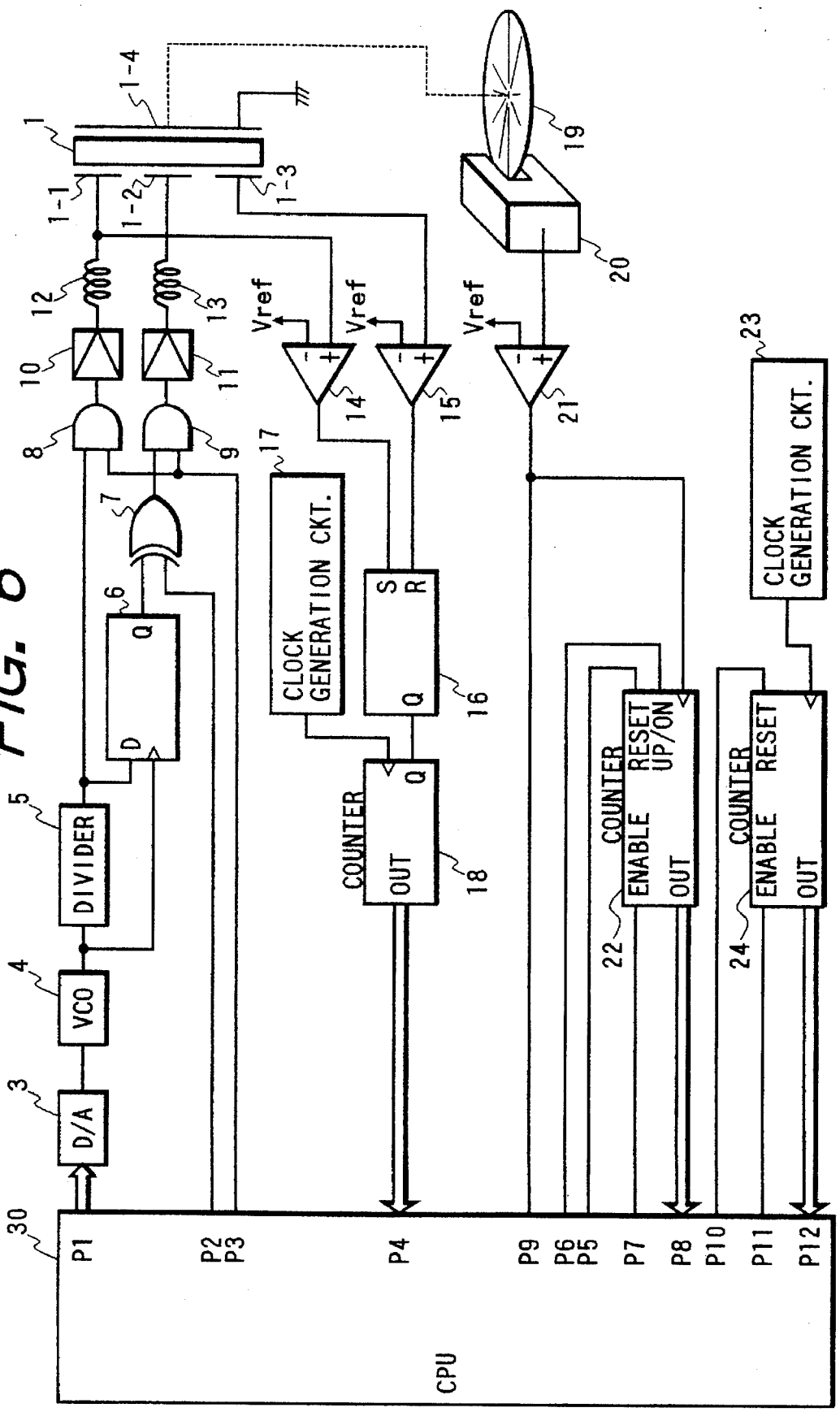
FIG. 6 is a circuit diagram showing a vibration type motor device according to the second embodiment of the present invention.
Figure 7:
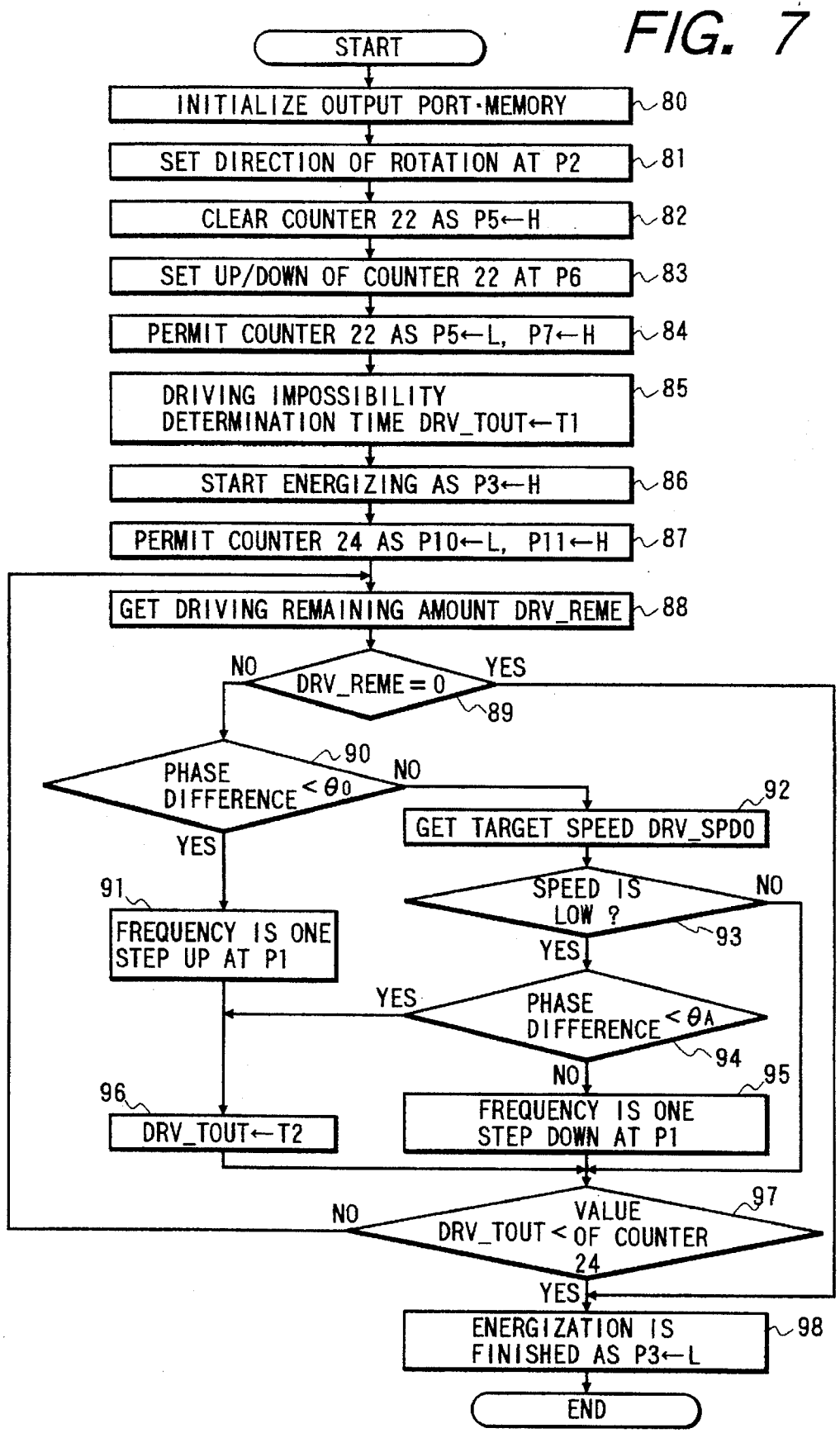
FIG. 7 is a flow chart for explaining the operation of the embodiment shown in FIG. 6.

The second embodiment will be described with reference to the diagram of FIG. 6 and the flow charts of FIGS. 7 and 8. Note that, in the diagram of FIG. 6, the same reference numerals denote the same parts as in FIG. 1, and a detailed description thereof will be omitted. Referring to FIG. 6, a microcomputer (to be referred to as a CPU hereinafter) 30 comprises output ports P1, P2, P3, P5, P6, P7, P10, and P11, input ports P4, P8, and P12, and an input port P9. At the input port P9, an interruption is generated at the leading edge of an input signal.

Next, the operation of the CPU 30 will be described with reference to the flow chart of FIG. 7.

Step 80: First of all, each output port is initialized to low level, and memories DRV_SPDO and DRV_TOUT are initialized to 0.

Step 81: The direction of driving of a vibration wave motor is set. That is, the output port P2 is set to low level when the vibration wave motor is rotated clockwise, and to high level when the motor is rotated counterclockwise.

Step 82: The output port P5 is set to high level to clear the output of a counter 22 which indicates the number of rotations of a pulse plate 19.

Step 83: It is set at the output port P6 whether the counter 22 counts up or down. In this embodiment, when the vibration wave motor is rotated clockwise, a high-level signal is output to the output port P6 to cause the counter 22 to count up. To the contrary, when the motor is rotated counterclockwise, a low-level signal is output to the output port P6 to cause the counter 22 to count down.

Step 84: The output port P5 is set to low level, and the output port P7 is set to high level to permit counter 22 to count.

Step 85: A driving impossibility determination time T1 is stored in the memory DRV_TOUT.

Step 86: The output port P3 is set to high level to start energization to the vibration wave motor.

Step 87: After the vibration wave motor is energized, the output port P10 is set to low level, and the output port P11 is set to high level to permit a counter 24 to count.

Step 88: The driving remaining amount is calculated on the basis of a target driving amount DRV_DATA and the count value of the counter 22 and stored in a memory DRV_REME.

Step 89: If the driving remaining amount DRV_REME is 0, the flow advances to step 98 to finish the driving.

Step 90: The count value of a counter 18, i.e., the phase difference is read from the input port P4 and compared with θ0. If the phase difference is smaller than θ0 from the comparison result, the frequency is shifted to the high-frequency side in step 91. If the phase difference is not smaller than θ0, the flow advances to step 92.

Step 91: Data output from the current port P1 is decremented by one to shift the driving frequency to the high-frequency side, and the flow advances to step 96.

Step 92: A target driving speed DRV_SPED corresponding to the driving remaining amount DRV_REME is read out and stored in the memory DRV_SPDO.

Step 93: The contents of the memory DRV_SPDO are compared with the count value of the counter 24 which represents the current pulse interval. If DRV_SPDO is smaller than the count value, the actual speed is lower than the target speed, so that the flow advances to step 94 to perform processing for acceleration. If DRV_SPDO is larger than the count value, the flow advances to step 97.

Step 94: Since it has been determined in step 93 that the actual speed is lower than the target speed, the speed must be increased. If, however, the phase difference is smaller than θA as shown in the graph of FIG. 3, the current frequency is near the resonance frequency, so that the frequency is not changed, and the flow advances to step 96. If the phase difference is not smaller than θA, the current frequency has a margin with respect to the resonance frequency, so that the flow advances to step 95 to execute the acceleration.

Step 95: Data output to the port P1 is increased by one, and the frequency is decreased to execute the acceleration. Then, the flow advances to step 97.

Step 96: Since the phase difference is smaller than θ0 or θA, a frequency sufficient to drive the vibration wave motor is attained. A driving impossibility determination time T2 is stored in the memory DRV_TOUT (T1>T2).

Step 97: In step 85, the driving impossibility determination time T1 is stored in the memory DRV_TOUT. However, once the phase difference becomes smaller than θ0 or θA, the driving impossibility determination time T2 is stored in the memory DRV_TOUT. The contents of the memory DRV_TOUT are compared with the count value of the counter 24 which represents a pulse interval. If DRV_TOUT is smaller than the count value, it is determined that driving is impossible, and the flow advances to step 98. If DRV_TOUT is not smaller than the count value, the flow returns to step 88.

Step 98: Since the target driving amount has been attained, or it has been determined that driving is impossible, the output port P3 is set to low level to finish the energization to the vibration wave motor.

Figure 8:
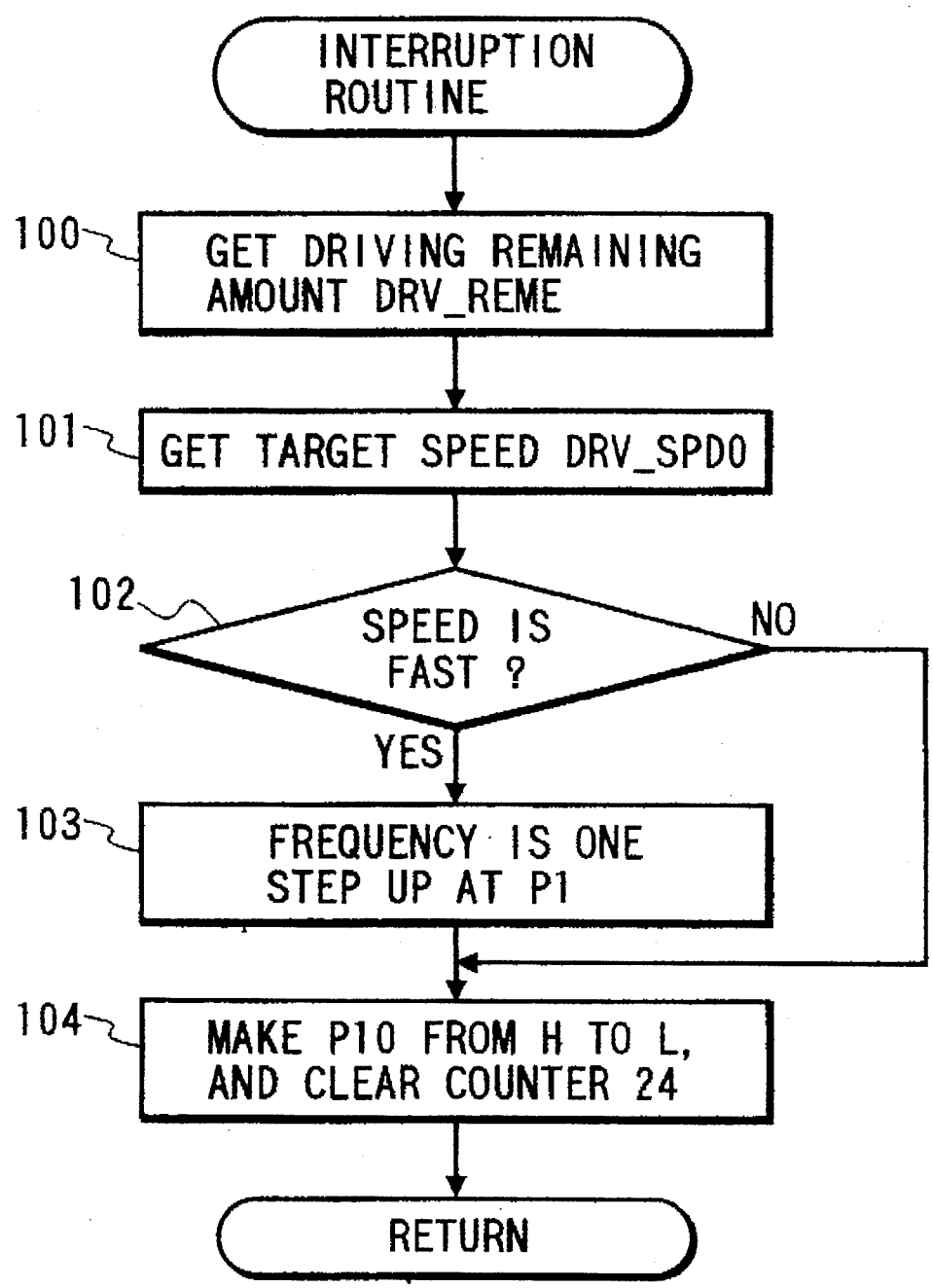
FIG. 8 is a flow chart for explaining the operation of the embodiment shown in FIG. 6 in conjunction with FIG. 7.

FIG. 8 is a flow chart for explaining an interruption routine which is executed when a leading edge is input to the input port P9 to generate an interruption.

Step 100: The driving remaining amount is calculated on the basis of the target driving amount DRV_DATA and the count value of the counter 22 and stored in the memory DRV_REME.

Step 101: The target driving speed DRV_SPED corresponding to the driving remaining amount DRV_REME is read out and stored in the memory DRV_SPDO.

Step 102: The contents of the memory DRV_SPDO are compared with the count value of the counter 24 which represents the current pulse interval. If DRV_SPDO is larger than the count value, the actual speed is higher than the target object, so that the flow advances to step 103 to perform deceleration. If DRV_SPDO is smaller than the count value, the flow advances to Step 104.

Step 103: Data output to the port P1 is decremented by one, and the frequency is increased to execute the deceleration.

Step 104: The output port P10 is set to high level and then low level to clear the counter 24 in order to measure the next pulse interval. The interruption routine is finished.

As has been described above, according to the second embodiment, when the phase difference becomes smaller than θA, the frequency at this time is held because a further decrease in frequency may abruptly decrease the number of rotations. It is determined that driving is impossible by using the driving impossibility determination time T2. When the phase difference is larger by a predetermined amount than θA on the low-frequency side with respect to the resonance frequency, a frequency sufficient to drive the vibration wave motor is not attained. In this case, the time T1 longer than the time T2 is used as the driving impossibility determination time to perform driving impossibility determination. In this manner, the driving impossibility determination time is set for a phase difference larger than θA. With this setting, even if a driving state detection means does not correctly function due to any accident, i.e., a correct phase difference is not output, a failure of stopping energization can be avoided.

Figure 9:
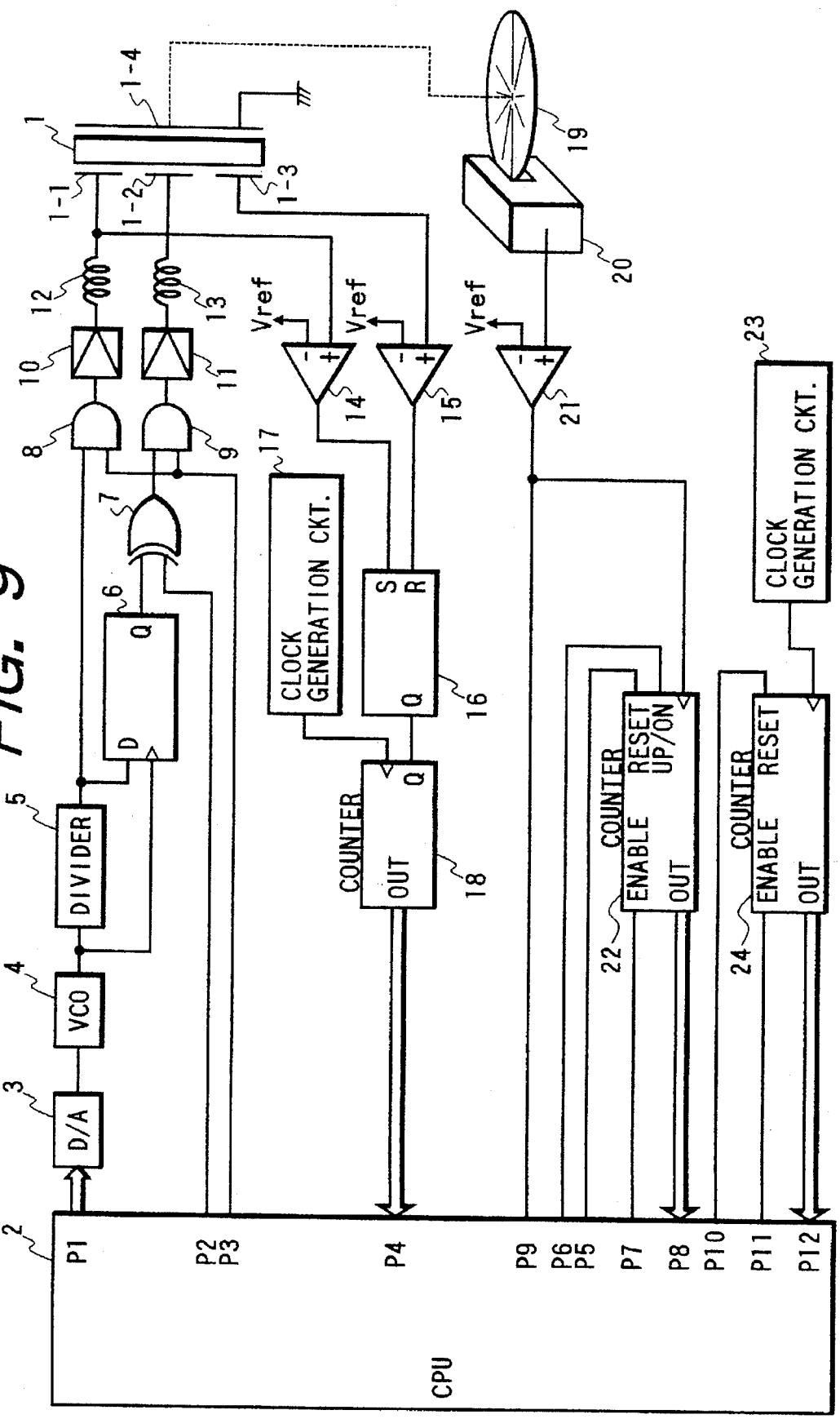
FIG. 9 is a circuit diagram showing a vibration type motor device according to the third embodiment of the present invention.
Figure 10:
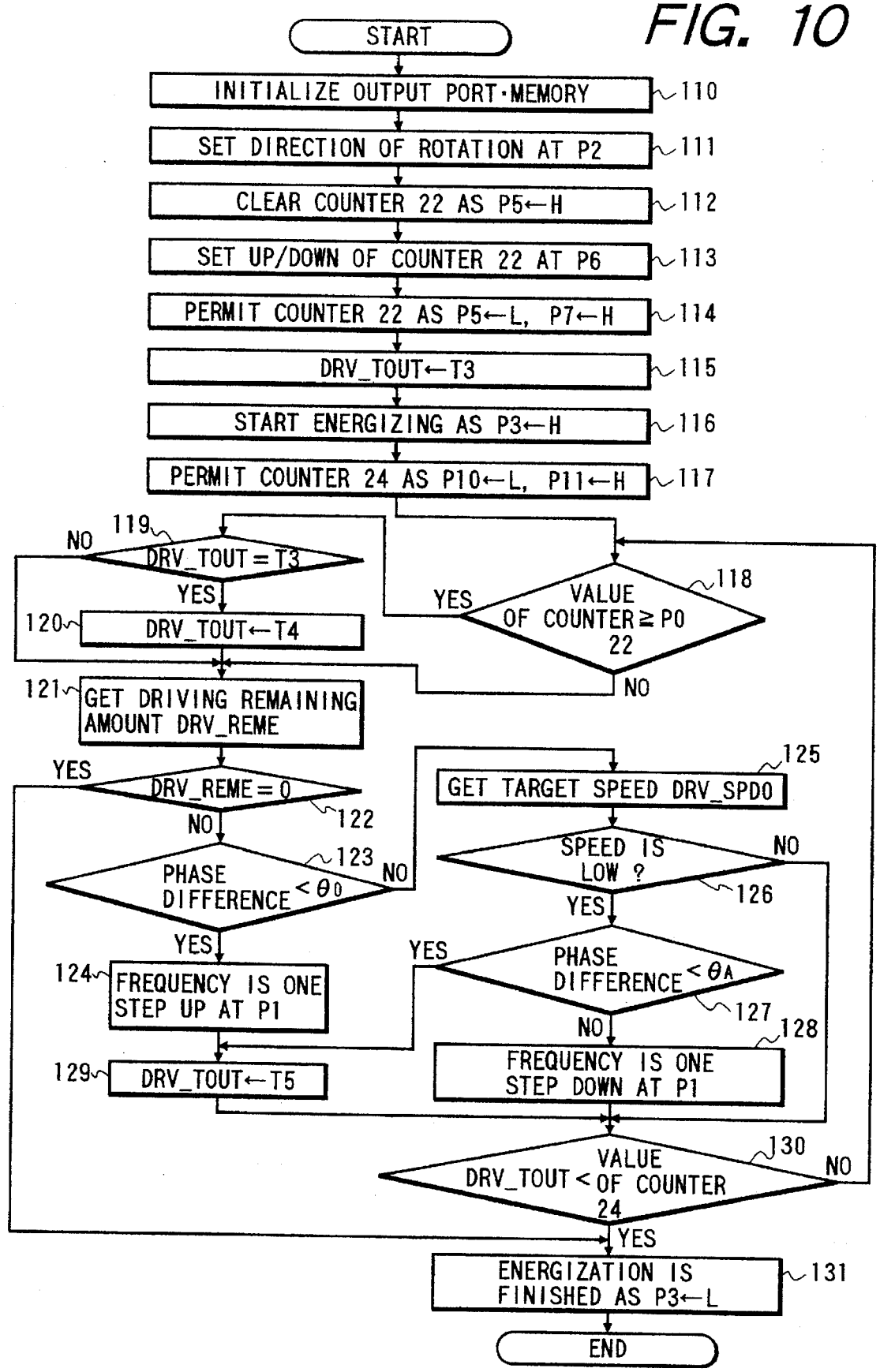
FIG. 10 is a flow chart for explaining the operation of the embodiment shown in FIG. 9.

The third embodiment will be described with reference to the diagram of FIG. 9 and the flow charts of FIGS. 10 and 11. Note that, in the diagram of FIG. 9, the same reference numerals denote the same parts as in FIG. 1, and a detailed description thereof will be omitted. Referring to FIG. 9, a microcomputer (to be referred to as a CPU hereinafter) 31 comprises output ports P1, P2, P3, P5, P6, P7, P10, and P11, input ports P4, P8, and P12, and an input port P9. At the input port P9, an interruption is generated at the leading edge of an input signal.

Next, the operation of the CPU 31 will be described with reference to the flow chart of FIG. 10.

Step 110: First of all, each output port is initialized to low level, and memories DRV_SPDO and DRV_TOUT are initialized to 0.

Step 111: The direction of driving of a vibration wave motor is set. That is, the output port P2 is set to low level when the vibration wave motor is rotated clockwise, and to high level when the motor is rotated counterclockwise.

Step 112: The output port P5 is set to high level to clear the output of a counter 22 which indicates the number of rotation of a pulse plate 19.

Step 113: It is set at the output port P6 whether the counter 22 counts up or down. In this embodiment, when the vibration wave motor is rotated clockwise, the output port P6 is set to high level to cause the counter 22 to count up. To the contrary, when the motor is rotated counterclockwise, the output port P6 is set to low level to cause the counter 22 to count down.

Step 114: The output port P5 is set to low level, and the output port P7 is set to high level to permit counter 22 to count.

Step 115: A driving impossibility determination time T3 is stored in the memory DRV_TOUT.

Step 116: The output port P3 is set to high level to start energization to the vibration wave motor.

Step 117: After the vibration wave motor is energized, the output port P10 is set to low level, and the output port P11 is set to high level to permit a counter 24 to count.

Step 118: It is checked whether the absolute value of the count value of the counter 22 which represents the number of rotations of the pulse plate 19 is equal to or larger than a predetermined amount (to be referred to as P0 hereinafter). If the absolute value is equal to or larger than P0, it is determined that the motor has been driven once, and the flow advances to step 119. If the absolute value of the count value of the counter 22 is smaller than P0, it is determined that the motor is not sufficiently driven, and the flow advances to step 121.

Step 119: If a driving impossibility determination time stored in the memory DRV_TOUT is T3, the phase difference is larger than θA, and the flow advances to step 120. If the driving impossibility determination time stored in the memory DRV_TOUT is not T3, the flow advances to step 121.

Step 120: Since it has been confirmed that the phase difference is larger than θA, the contents of the memory DRV_TOUT are rewritten to a time T4 (T3>T4).

Step 121: The driving remaining amount is calculated on the basis of a target driving amount DRV_DATA and the count value of the counter 22 and stored in a memory DRV_REME.

Step 122: If the driving remaining amount DRV_REME is 0, the flow advances to step 131 to finish the driving.

Step 123: The count value of a counter 18, i.e., the phase difference is read from the input port P4 and compared with θ0. If the phase difference is smaller than θ0 from the comparison result, the frequency is shifted to the high-frequency side in step 124. If the phase difference is not smaller than θ0, the flow advances to step 125.

Step 124: Data output from the current port P1 is decremented by one to shift the driving frequency to the high-frequency side, and the flow advances to step 129.

Step 125: A target driving speed DRV_SPED corresponding to the driving remaining amount DRV_REME is read out and stored in the memory DRV_SPDO.

Step 126: The contents of the memory DRV_SPDO are compared with the count value of the counter 24 which represents the current pulse interval. If DRV_SPDO is smaller than the count value, the actual speed is lower than the target speed, so that the flow advances to step 127 to perform processing for acceleration. If DRV_SPDO is larger than the count value, the flow advances to step 130.

Step 127: Since it has been determined in step 126 that the actual speed is lower than the target speed, the speed must be increased. If, however, the phase difference is smaller than θA as shown in the graph of FIG. 3, the current frequency is near the resonance frequency, so that the frequency is not changed, and the flow advances to step 129. If the phase difference is not smaller than θA, the current frequency has a margin with respect to the resonance frequency, so that the flow advances to step 128 to execute the acceleration.

Step 128: Data output to the port P1 is increased by one, and the frequency is decreased to execute the acceleration. Then, the flow advances to step 130.

Step 129: Since the phase difference is smaller than θ0 or θA, a frequency sufficient to drive the vibration wave motor is attained. A driving impossibility determination time T5 is stored in the memory DRV_TOUT (T4>T5).

Step 130: The driving impossibility determination time stored in the memory DRV_TOUT is compared with the count value of the counter 24 which represents a pulse interval. If DRV_TOUT is smaller than the count value, it is determined that driving is impossible, and the flow advances to step 131. If DRV_TOUT is not smaller than the count value, the flow returns to step 118.

Step 131: Since the target driving amount has been attained, or it has been determined that driving is impossible, the output port P3 is set to low level to finish the energization to the vibration wave motor.

Figure 11:
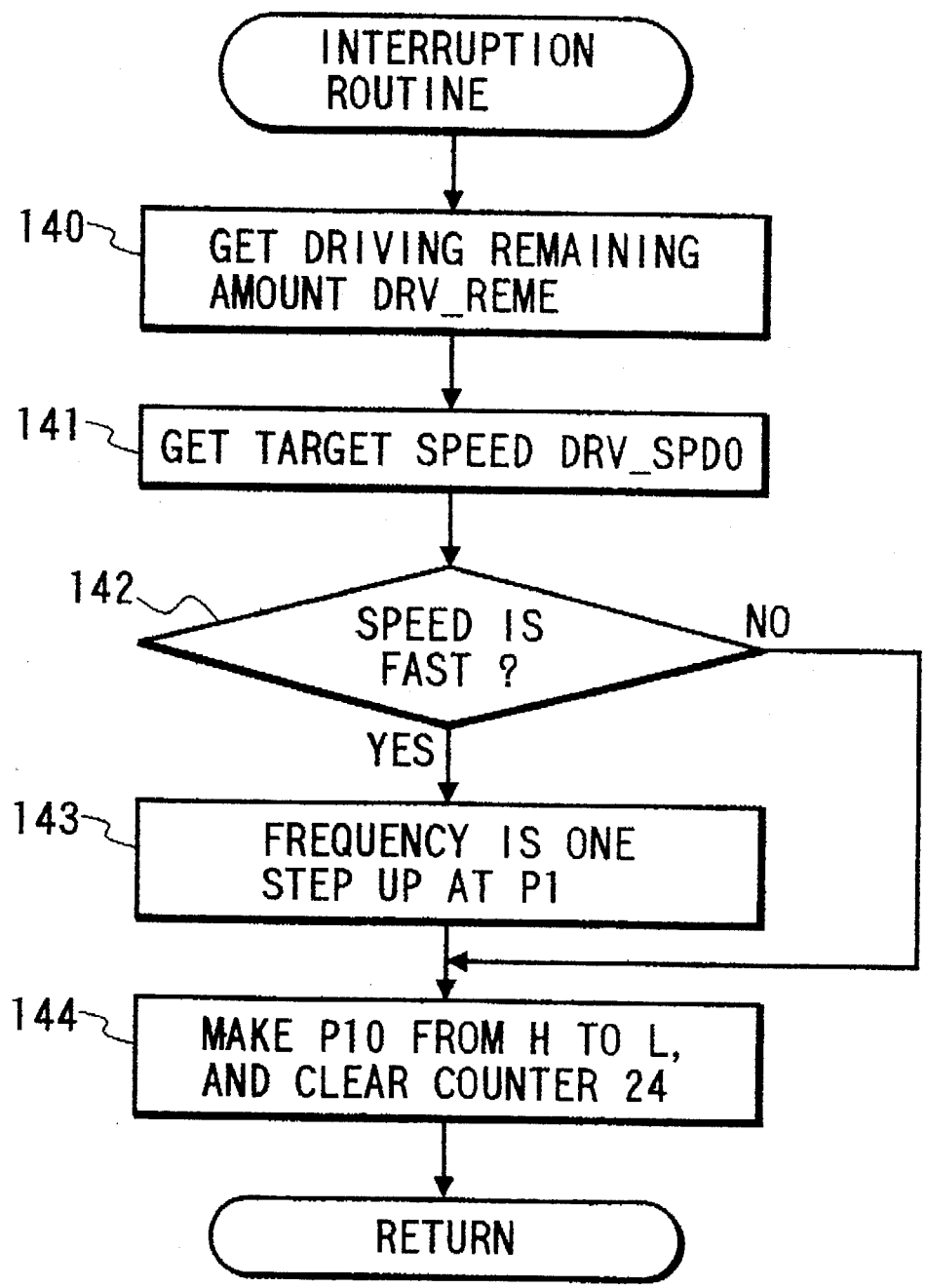
FIG. 11 is a flow chart for explaining the operation of the embodiment shown in FIG. 9 in conjunction with FIG. 10.

FIG. 11 is a flow chart for explaining an interruption routine which is executed when a leading edge is input to the input port P9 to generate an interruption.

Step 140: The driving remaining amount is calculated on the basis of the target driving amount DRV_DATA and the count value of the counter 22 and stored in the memory DRV_REME.

Step 141: The target driving speed DRV_SPED corresponding to the driving remaining amount DRV_REME is read out and stored in the memory DRV_SPDO.

Step 142: The contents of the memory DRV_SPDO are compared with the count value of the counter 24 which represents the current pulse interval. If DRV_SPDO is larger than the count value, the actual speed is higher than the target object, so that the flow advances to step 143 to perform deceleration. If DRV_SPDO is smaller than the count value, the flow advances to step 144.

Step 143: Data output to the port P1 is decremented by one, and the frequency is increased to execute the deceleration.

Step 144: The output port P10 is set to high level and then low level to clear the counter 24 in order to measure the next pulse interval. The interruption routine is finished.

As has been described above, according to the third embodiment, when the phase difference becomes smaller than θA, the frequency at the time is held because a further decrease in frequency may abruptly decrease the number of rotation. It is determined that driving is impossible by using the driving impossibility determination time T5. When the phase difference is larger by a predetermined amount than θA on the low-frequency side with respect to the resonance frequency, and the vibration wave motor has been driven even once, it is determined that driving is impossible by using the time T4 longer than the time T5. To the contrary, if the motor has never been driven, it is determined that driving is impossible by using the time T3 longer than the time T4. In this manner, even if the phase difference is larger than θA, proper driving impossibility determination can be performed by changing the driving impossibility determination time in accordance with a case in which the motor has been driven once and a case in which the motor has never been driven.

Note that, in each of the above-mentioned embodiments, a motor to be used may be of a type in which a rotor is driven by the vibration of a stator (vibration member), or of a type in which a motor itself moves with respect to a contact member. Further, a target object to be moved by the driving force of the motor includes members such as a paper sheet which is directly fed by the vibration force of the vibration member without passing through a rotor.

What is claimed is:

1. A vibration type motor device, which excites a vibration member by supplying a cyclic signal to an electromechanical energy conversion element so as to obtain a driving force, comprising:

(a) driving state detection means for detecting a driving state of a member driven relative to said motor device by a driving force of said motor device, or a driving state of said motor device;

(b) determination means for determining whether driving is impossible on the basis of a detection result obtained by said driving state detection means;

(c) vibration state detection means for detecting a vibration state of said motor device; and (d) control means for controlling an operative/inoperative state of said determination means in accordance with the vibration state of said motor device which is detected by said vibration state detection means.

2. A device according to claim 1, wherein said vibration state detection means detects whether said motor device is driven at a frequency on a resonant side or at a frequency apart from the resonant side, and said control means operates said determination means when it is detected that said motor device is driven at the frequency on the resonant side.

3. A device according to claim 1, wherein said determination means determines that driving is impossible when said member is held in a non-driving state for a predetermined time.

4. A vibration type motor device, which excites a vibration member by supplying a cyclic signal to an electro-mechanical energy conversion element so as to obtain a driving force, comprising:

(a) driving state detection means for detecting a driving state of a member driven relative to said motor device by a driving force of said motor device, or a driving state of said motor device;

(b) determination means for determining whether driving is impossible on the basis of a detection result obtained by said driving state detection means;

(c) vibration state detection means for detecting a vibration state of said motor device; and (d) changing means for changing a driving impossibility determination reference of said determination means in accordance with the vibration state of said motor device which is detected by said vibration state detection means.

5. A device according to claim 4, wherein said vibration state detection means detects whether said motor device is driven at a frequency on a resonant side or at a frequency apart from the resonant side, and said changing means sets the determination reference to a first low reference when it is detected that said motor device is driven at the frequency on the resonant side, and sets the determination reference to a second high reference when it is detected that said motor device is driven at the frequency apart from the resonant side.

6. A device according to claim 5, wherein said determination means determines that driving is impossible when the first reference is set, and said member is held in a non-driving state for a first time, and determines that driving is impossible when the second reference is set, and said member is held in the non-driving state for a second time longer than the first time.

7. A vibration wave motor driving device having driving state detection means for detecting a driving state of a vibration wave motor to output whether said vibration wave motor is driven at a resonance frequency or at a frequency near the resonance frequency, driving amount detection means for detecting a driving amount of a member driven by said vibration wave motor, or a driving amount of said motor, and driving impossibility determination means for determining that driving of said vibration wave motor is impossible, comprising said driving impossibility determination means switches a driving impossibility determination reference in accordance with an output of said driving state detection means and an output of said driving amount detection means.

8. A device according to claim 7, wherein said driving impossibility determination means determines that driving is impossible when the output of the said driving amount detection means does not change for a predetermined time; and the predetermined time is switched to a first time when the output of said driving state detection means indicates that said vibration wave motor is driven at the resonance frequency or at the frequency near the resonance frequency, to a second time not shorter than the first time when the output of said driving state detection means indicates that said vibration wave motor is not driven at the resonance frequency or at the frequency near the resonance frequency, and the output of said driving amount detection means is equal to or smaller than a predetermined value, and to a third time shorter than the second time when the output of said driving amount detection means is not equal to or not smaller than the predetermined value.

9. A device according to claim 5, further comprising frequency shift means for shifting a frequency of the cyclic signal from a first frequency to a second frequency in a direction of the resonance frequency, so that said determination means is operated during a frequency shift operation of said shift means when said vibration state detection means detects that said vibration wave motor is driven at the frequency apart from the resonance frequency, and said determination means is operated upon stopping the frequency shift operation of said shift means when said detection means detects that said vibration wave motor is driven at the frequency on the resonant side.

10. A vibration type motor device, which excites a vibration member by applying a cyclic signal to an electro-mechanical energy conversion element so as to obtain a driving force, comprising:

(a) a determination circuit for determining whether a target object can be relatively driven by said motor device; and (b) a control circuit for adjusting an operation state of said determination circuit in accordance with a relationship between a frequency of the cyclic signal to be applied to said electro-mechanical energy conversion element, and a resonance frequency.

11. A vibration type motor device, which excites a vibration member by applying a cyclic signal to an electro-mechanical energy conversion element so as to obtain a driving force, comprising:

(a) a determination circuit for determining whether a target object can be relatively driven by said motor device; and (b) an adjustment circuit for adjusting a determination reference of said determination circuit in accordance with a relationship between a frequency of the cyclic signal to be applied to said electro-mechanical energy conversion element, and a resonance frequency.

* * * * *

UNITED STATES PATENT AND TRADEMARK OFFICE
CERTIFICATE OF CORRECTION

PATENT NO. : 5,661,359                    Page 1 of 2
DATED      : August 26, 1997
INVENTOR(S): MITSUHIRO KATSURAGAWA It is certified that error appears in the above-identified patent and that said Letters Patent is hereby corrected as shown below:

IN THE DRAWINGS:

Sheet 3 of 11

FIG. 3, "ROTATION" should read --ROTATIONS-- (both occurrences).

Column 3

Line 29, "00H" should read --OOH--.

Column 5

Line 12, "rotation" should read --rotations--.

Column 6

Line 53, "00H" should read --OOH--.

UNITED STATES PATENT AND TRADEMARK OFFICE
CERTIFICATE OF CORRECTION

PATENT NO. : 5,661,359
DATED : August 26, 1997
INVENTOR(S) : MITSUHIRO KATSURAGAWA It is certified that error appears in the above-identified patent and that said Letters Patent is hereby corrected as shown below:

<u>Column 10</u>

Line 49, "rotation" should read --rotations--.

<u>Column 12</u>

Line 35, "rotation" should read --rotations--.

Signed and Sealed this

Seventeenth Day of March, 1998

Attest:

BRUCE LEHMAN

*Attesting Officer*      *Commissioner of Patents and Trademarks*